United States Patent
Wang et al.

(10) Patent No.: US 10,330,985 B2
(45) Date of Patent: Jun. 25, 2019

(54) RUBBING ALIGNMENT METHOD AND APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Kai Wang, Beijing (CN); Feng Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/326,859

(22) PCT Filed: Oct. 22, 2015

(86) PCT No.: PCT/CN2015/092495
§ 371 (c)(1),
(2) Date: Jan. 17, 2017

(87) PCT Pub. No.: WO2016/206256
PCT Pub. Date: Dec. 29, 2016

(65) Prior Publication Data
US 2018/0101071 A1  Apr. 12, 2018

(30) Foreign Application Priority Data
Jun. 24, 2015  (CN) .......................... 2015 1 0355296

(51) Int. Cl.
*G02F 1/1337* (2006.01)
*G02F 1/13* (2006.01)
(Continued)

(52) U.S. Cl.
CPC ...... *G02F 1/133784* (2013.01); *G02F 1/1303* (2013.01); *G02F 1/139* (2013.01); *B24B 9/065* (2013.01)

(58) Field of Classification Search
CPC .................................................. G02F 1/133784
See application file for complete search history.

(56) References Cited

U.S. PATENT DOCUMENTS

2002/0061361 A1* 5/2002 Nakahara .......... G02F 1/133788
427/58
2016/0291355 A1   10/2016 Liu et al.

FOREIGN PATENT DOCUMENTS

CN        1837934 A    9/2006
CN      102087442 A    6/2011
(Continued)

OTHER PUBLICATIONS

First Office Action for Chinese Application No. 201510355296.3, dated May 25, 2017, 6 Pages.
(Continued)

*Primary Examiner* — Edmond C Lau
(74) *Attorney, Agent, or Firm* — Brooks Kushman P.C.

(57) ABSTRACT

The present disclosure relates to the field of manufacturing liquid crystal display devices, and in particular to a rubbing alignment method. The method includes the following steps: providing a transparent substrate with an alignment film on a surface of the transparent substrate, and driving the transparent substrate to move in a first direction; and rubbing in a rolling manner the alignment film on the surface of the transparent substrate through a rubbing roller with a rubbing cloth on a surface of the rubbing roller, during movement of the transparent substrate. When rubbing in the rolling manner the alignment film on the surface of the transparent substrate through the rubbing roller with the rubbing cloth on the surface of the rubbing roller, the rubbing alignment
(Continued)

method further includes carding lint on the rubbing cloth using an ultrasonic wave in real time.

10 Claims, 2 Drawing Sheets

(51) Int. Cl.
    *G02F 1/139*     (2006.01)
    *B24B 9/06*     (2006.01)

(56) References Cited

FOREIGN PATENT DOCUMENTS

| | | | |
|---|---|---|---|
| CN | 203299496 U | | 11/2013 |
| CN | 103676329 A | | 3/2014 |
| CN | 203465494 U | | 3/2014 |
| CN | 203470403 U | * | 3/2014 |
| CN | 104950522 A | | 9/2015 |

OTHER PUBLICATIONS

International Search Report and Written Opinion for Application No. PCT/CN2015/092495, dated Mar. 31, 2016, 10 Pages.
Fourth Office Action for Chinese Application No. 201510355296.3, dated Oct. 25, 2018, 6 Pages.

\* cited by examiner

RUBBING ALIGNMENT METHOD AND APPARATUS

CROSS-REFERENCE TO RELATED APPLICATIONS

This application is the U.S. national phase of PCT Application No. PCT/CN2015/092495 filed on Oct. 22, 2015, which claims priority to Chinese Patent Application No. 201510355296.3 filed on Jun. 24, 2015, the disclosures of which are incorporated in their entirety by reference herein.

TECHNICAL FIELD

The present disclosure relates to the field of manufacturing liquid crystal display devices, in particular to a rubbing alignment method and apparatus.

BACKGROUND

In liquid crystal display panels, the intensity of transmitted light is mainly adjusted by controlling the liquid crystal molecules in the panels through electric fields. Therefore, the arrangement of the liquid crystal molecules, especially the initial arrangement is very important. The arrangement of the liquid crystal molecules is mainly controlled by alignment films which are on a color filter substrate and a TFT array substrate and have alignment directions. The alignment films make the liquid crystal molecules arranged in a certain direction when no power is applied.

The alignment direction of the alignment film may be obtained by rubbing the alignment film through a rubbing cloth rotating at a high speed. However, the inventors of the present disclosure find in experiments that for fringe field switching (FFS) and in-plane switching (IPS) liquid crystal display panels, since inner surfaces of transparent substrates of the liquid crystal display panels have regularly arranged pixel electrodes, thus the alignment rubbing stripes generated by rubbing using the rubbing cloth have poor uniformity and there is a high incidence of foreign matter in the liquid crystal display panels. The primary reason is the lint of the rubbing cloth is non-uniformly aggregated. That is, when the rubbing cloth having non-uniformly aggregated lint is used to rub the liquid crystal display panel, the alignment rubbing stripes on the surface of the transparent substrate are not uniform.

SUMMARY

(I) Technical Problem to be Solved

The present disclosure aims to solve the technical problem that the alignment rubbing stripes on the surface of the transparent substrate of the liquid crystal display panel in the related art is not uniform.

(II) Technical Solutions

In order to solve the above-mentioned technical problem, the present disclosure provides a rubbing alignment method. The method includes the following steps: S1, providing a transparent substrate with an alignment film on a surface of the transparent substrate, and driving the transparent substrate to move in a first direction; and S2, rubbing in a rolling manner the alignment film on the surface of the transparent substrate through a rubbing roller with a rubbing cloth on a surface of the rubbing roller, during movement of the transparent substrate. The step of S2 further includes: carding lint on the rubbing cloth using an ultrasonic wave in real time.

In some embodiments, the ultrasonic wave propagates to a surface of the rubbing cloth in a tangential direction of the rubbing roller.

In some embodiments, the ultrasonic wave propagates in a propagation direction which is at an angle of 45° with respect to the first direction.

In some embodiments, a position where the ultrasonic wave propagates to the rubbing cloth is located downstream of a position where the rubbing cloth is in touch with the alignment film.

In some embodiments, a frequency of the ultrasonic wave is less than or equal to 5 MHz.

The present disclosure further provides a rubbing alignment apparatus. The rubbing alignment apparatus includes: a frame; a base on the frame and configured to support a transparent substrate; a linear driving mechanism configured to drive the base to linearly move; a rubbing roller in a moving path of the base and with a rubbing cloth at a surface of the rubbing roller; a rolling driving mechanism configured to drive the rubbing roller to roll; and an ultrasonic device on the frame. The ultrasonic device includes an ultrasonic wave emitting port, and the ultrasonic wave emitting port is directed to the rubbing cloth at the surface of the rubbing roller and configured to propagate an ultrasonic wave to the rubbing cloth.

In some embodiments, the ultrasonic device is configured to propagate the ultrasonic wave in a propagation direction which is in a tangential direction of the rubbing roller.

In some embodiments, an angle of 45° is defined between an imaginary extension line of the ultrasonic wave emitting port and the base.

In some embodiments, a width of the ultrasonic wave emitting port is larger than or equal to a length of the rubbing roller.

In some embodiments, the ultrasonic wave emitting port is a crack or opening.

(III) Beneficial Effects

The above-mentioned technical solutions have the following advantages: the lint of the rubbing cloth is carded uniformly and in real time using ultrasonic waves, so that the carded lint is more uniform. Therefore, the non-uniform alignment rubbing stripes on the surface of the transparent substrate are improved and the yield of liquid crystal display panel is increase.

DETAILED DESCRIPTION

In order to make the objectives, technical solutions and advantages of the embodiments of the present disclosure more clear, the technical solutions of the embodiments of the present disclosure will be clearly and completely described below with reference to the accompanying drawings of the embodiments of the present disclosure. Apparently, the described embodiments are part of the embodiments of the present disclosure, but not all the embodiments. All other embodiments obtained by a person of ordinary skills in the art based on the described embodiments of the present disclosure are intended to be within the scope of the present disclosure.

Figure 1:
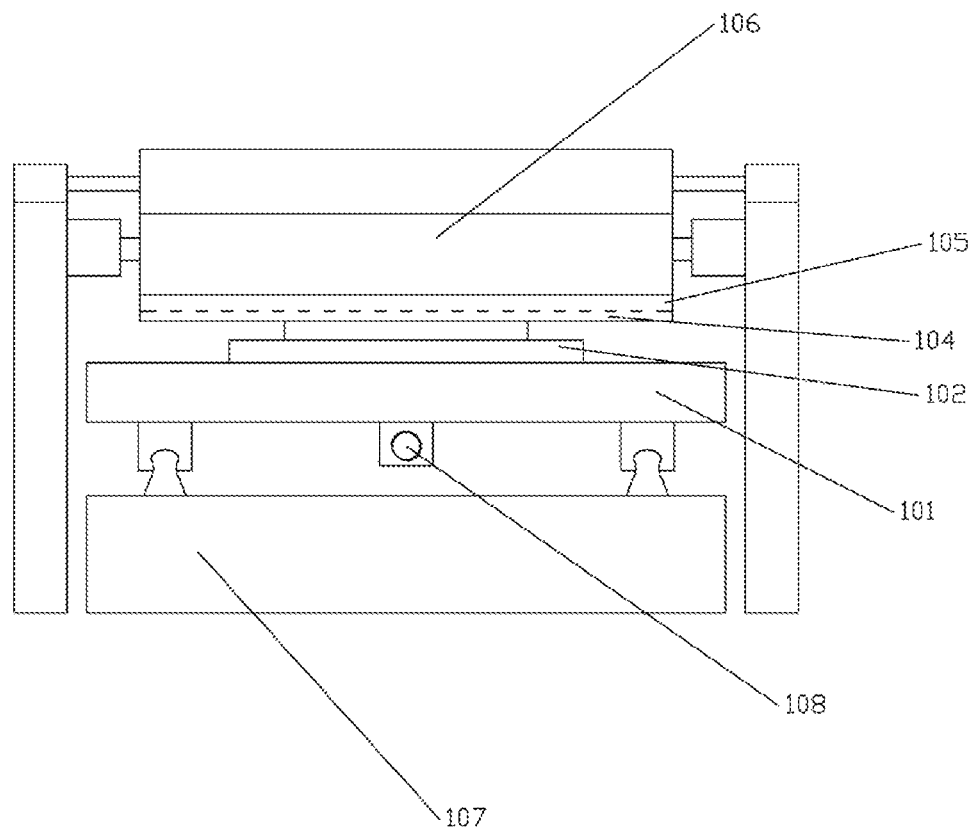
FIG. 1 illustrates a front view of a rubbing alignment apparatus according to an embodiment of the present disclosure.
Figure 2:
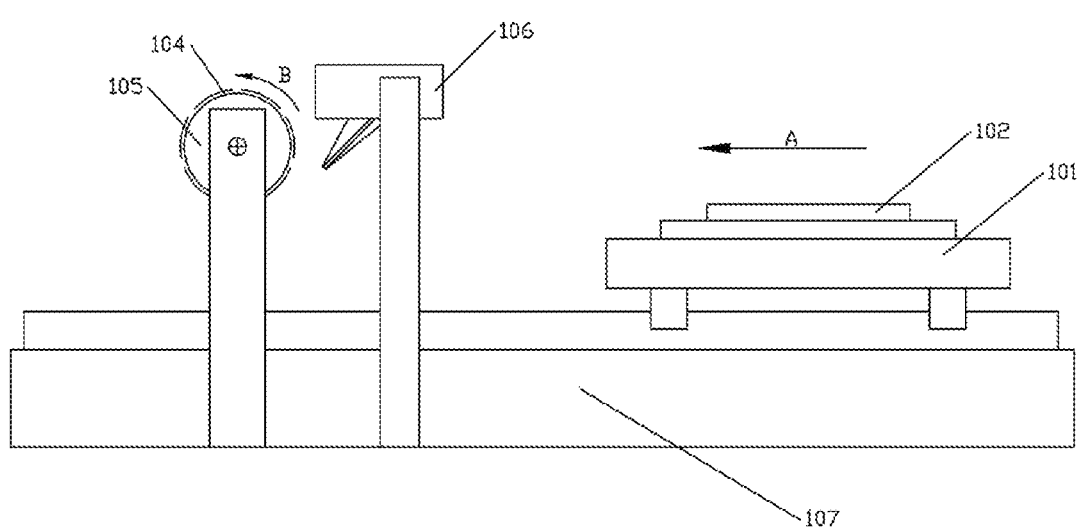
FIG. 2 illustrates a left side view of a rubbing alignment apparatus according to an embodiment of the present disclosure.
Figure 3:
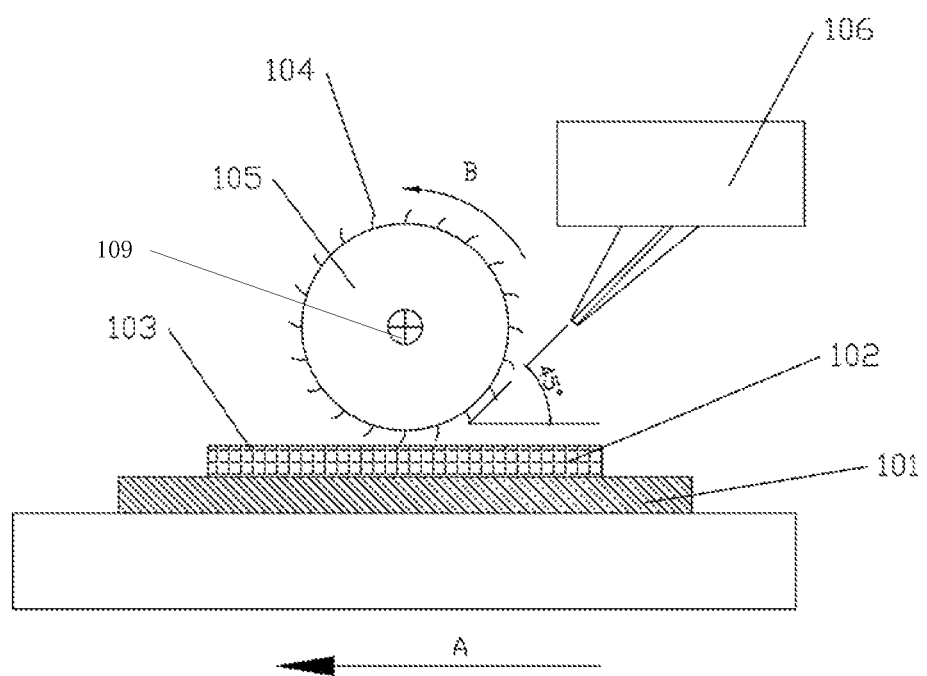
FIG. 3 illustrates a schematic diagram of a rubbing alignment method according to an embodiment of the present disclosure.

As shown in FIGS. 1 and 2, an embodiment of the present disclosure provides a rubbing alignment apparatus. The rubbing alignment apparatus includes a frame 107, an ultrasonic device 106, a base 101, a linear driving mechanism 108, a rubbing roller 105 and a rolling driving mechanism 109 (as shown in FIG. 3). The base 101 is arranged on the frame 107 and is to support a transparent substrate 102. The linear driving mechanism 108 is to drive the base 101 to move linearly. A rubbing cloth 104 is attached on a surface of the rubbing roller 105. The rubbing cloth 104 may be made of linen or nylon. The rubbing roller 105 is arranged in a moving path of the transparent substrate 102, and is rolled by the rolling driving mechanism. Specifically, in the present embodiment, the frame 107 is provided with linear sliding rails and the base 101 is arranged on sliders at the sliding rails. The driving mechanism 108 employs a combination of a ball screw and a motor. The ball screw is arranged parallel to the linear sliding rails. The motor drives a screw rod of the ball screw to rotate. The rubbing roller 105 is rotatablely arranged above the linear sliding rails through one or more brackets on the frame 107. Optionally, the rubbing roller 105 is arranged above the base 101; and an angle between a central axis of the rubbing roller 105 and a moving direction of the base 101 may be adjusted in the range of 0° to 90°, so that the central axis of the rubbing roller 105 is at an angle with respect to the transparent substrate 102 and then the rubbing cloth 104 obliquely rubs the transparent substrate 102. The ultrasonic device 106 is provided on the frame 107, and has an ultrasonic wave emitting port. The ultrasonic wave emitting port is directed to the rubbing cloth 104 on the surface of the rubbing roller 105 so as to transmit ultrasonic waves to the rubbing cloth 104. The ultrasonic waves may card the lint of the rubbing cloth 104 in real time and uniformly, so that the carded lint is arranged more uniformly. Therefore, the non-uniform alignment rubbing stripes on the surface of the transparent substrate 102 are improved.

Further, a width of the ultrasonic wave emitting port is greater than a length of the rubbing roller 105, and the ultrasonic wave emitting port is parallel to the central axis of the rubbing roller 105. The ultrasonic waves emitted by the ultrasonic device 106 propagate in a tangential direction of the rubbing roller 105. The ultrasonic wave emitting port has a crack or opening. An angle between an imaginary extension line of the ultrasonic wave emitting port and the transparent substrate 102 may be optimized based on products, the rubbing cloths 104 and other process conditions. Optionally, the imaginary extension line of the ultrasonic wave emitting port is at an angle of 45° with respect to the transparent substrate 102. The propagation direction of the ultrasonic waves emitted by the ultrasonic device 106 may be optimized so that the lint of the rubbing cloth is more accurately carded, thereby improving the propagation efficiency of the ultrasonic waves to the surface of the rubbing cloth 104.

The present disclosure provides a rubbing alignment method. The rubbing alignment method may employ the rubbing alignment apparatus provided above. The rubbing alignment method includes the following steps.

Step S1 is to provide a transparent substrate 102 having an alignment film on a surface thereof and drive the transparent substrate 102 to move towards a first direction. Specifically, one method of manufacturing the transparent substrate 102 having the alignment film at the surface thereof includes: providing a transparent electrode on the surface of the transparent substrate 102; and forming an alignment film 103 on a surface of the transparent electrode. The thickness of the alignment film 103 is in the range of 500 Å to 1000 Å. Optionally, the thickness of the alignment film is preferably 500 Å, 600 Å, 750 Å, and 1000 Å. The transparent substrate may employ a glass substrate. As shown in FIG. 3, the transparent substrate 102 is arranged on the base 101 of the above-mentioned rubbing alignment apparatus, and the linear driving mechanism 108 drives the base 101 and the transparent substrate 102 to move in the first direction, i.e. the direction indicated by an arrow A in FIGS. 2-3.

Step S2 is to rub in a rolling manner the alignment film 103 on the surface of the transparent substrate 102 through the rubbing roller having the rubbing cloth on the surface of the rubbing roller during the moving of the transparent substrate 102. Optionally, the rubbing roller 105 rubs the alignment film 103 on the surface of the transparent substrate 102 in such a rolling manner that the direction of the tangential velocity of the bottom of the rubbing roller 105 is opposite to the moving direction of the transparent substrate 102. As shown in FIGS. 2 and 3, the rubbing roller 105 rolls in the direction indicated by an arrow B. During the rubbing in the rolling manner, the lint of the rubbing cloth 104 is carded using ultrasonic waves in real time. The lint of the rubbing cloth 104 is more uniform after being carded in real time by the ultrasonic waves.

Further, during the application of the ultrasonic waves, the ultrasonic waves propagate to the surface of the rubbing cloth 104 in the tangential direction of the rubbing roller 105, and the propagation direction of the ultrasonic waves is at an angle of 45° with respect to the moving direction of the transparent substrate 102. That is, the propagation direction of the ultrasonic waves is at an angle of 45° with respect to the first direction. Optionally, a position where the ultrasonic waves propagate to the rubbing cloth 104 is located downstream of a position where the rubbing cloth 104 is in touch with the alignment film 103, and frequencies of the ultrasonic waves are less than or equal to 5 MHz. It should be noted that the above-mentioned term downstream indicates a range of a radian of 180° in the rolling direction with the rubbing position between the rubbing roller 105 and the alignment film 103 as a reference. Such design may allow the ultrasonic waves to more accurately card the lint of the rubbing cloth 104, so that the alignment rubbing stripes on the surface of the transparent substrate are more uniform.

It should be noted that the above-mentioned embodiments are merely illustrative of the technical solutions of the present disclosure, but not intended to limit the present disclosure. While the present disclosure has been described in detail with reference to the foregoing embodiments, it should be understood by those skilled in the art that modifications may be made to the technical solutions described in the foregoing embodiments, or some of the technical features described in the foregoing embodiments may be substituted by equivalent features. These modifications or substitutions do not make the nature of corresponding technical solutions depart from the spirit and scope of the embodiments of the technical solutions of the embodiments of the present disclosure.

What is claimed is:

1. A rubbing alignment method, comprising:
providing a transparent substrate with an alignment film on a surface of the transparent substrate, and driving the transparent substrate to move in a first direction; and
rubbing in a rolling manner the alignment film on the surface of the transparent substrate through a rubbing roller with a rubbing cloth on a surface of the rubbing roller, during movement of the transparent substrate,
wherein when rubbing in the rolling manner the alignment film on the surface of the transparent substrate through the rubbing roller with the rubbing cloth on the surface of the rubbing roller, the rubbing alignment method further comprises carding lint on the rubbing cloth using an ultrasonic wave in real time;
wherein rubbing in the rolling manner the alignment film on the surface of the transparent substrate through the rubbing roller with the rubbing cloth on the surface of the rubbing roller, and carding lint on the rubbing cloth using an ultrasonic wave in real time, are performed simultaneously.

2. The rubbing alignment method according to claim 1, wherein when carding the lint on the rubbing cloth using the ultrasonic wave in real time, the ultrasonic wave propagates to a surface of the rubbing cloth in a tangential direction of the rubbing roller.

3. The rubbing alignment method according to claim 1, wherein when carding the lint on the rubbing cloth using the ultrasonic wave in real time, the ultrasonic wave propagates in a propagation direction which is at an angle of 45° with respect to the first direction.

4. The rubbing alignment method according to claim 1, wherein when carding the lint on the rubbing cloth using the ultrasonic wave in real time, a position where the ultrasonic wave propagates to the rubbing cloth is located downstream of a position where the rubbing cloth is in touch with the alignment film.

5. The rubbing alignment method according to claim 1, wherein in the step of S2, a frequency of the ultrasonic wave is less than or equal to 5 MHz.

6. A rubbing alignment apparatus, comprising:
a frame;
a base on the frame and configured to support a transparent substrate;
a linear driving mechanism configured to drive the base to linearly move;
a rubbing roller in a moving path of the base and with a rubbing cloth at a surface of the rubbing roller;
a rolling driving mechanism configured to drive the rubbing roller to roll; and
an ultrasonic device on the frame;
wherein the ultrasonic device comprises an ultrasonic wave emitting port, the ultrasonic wave emitting port is directed to the rubbing cloth at the surface of the rubbing roller and configured to propagate an ultrasonic wave to the rubbing cloth at the time the rubbing cloth is rubbing an alignment film on a surface of the transparent substrate.

7. The rubbing alignment apparatus according to claim 6, wherein the ultrasonic device is configured to propagate the ultrasonic wave in a propagation direction which is in a tangential direction of the rubbing roller.

8. The rubbing alignment apparatus according to claim 6, wherein an angle of 45° is defined between an imaginary extension line of the ultrasonic wave emitting port and the base.

9. The rubbing alignment apparatus according to claim 6, wherein a width of the ultrasonic wave emitting port is larger than or equal to a length of the rubbing roller.

10. The rubbing alignment apparatus according to claim 6, wherein the ultrasonic wave emitting port is a crack or opening.

* * * * *